US011534939B2

United States Patent
Kuhn et al.

(10) Patent No.: US 11,534,939 B2
(45) Date of Patent: Dec. 27, 2022

(54) DEVICE FOR APPLYING A BUILDING MATERIAL

(71) Applicant: SIKA TECHNOLOGY AG, Baar (CH)

(72) Inventors: Patrik Kuhn, Zürich (CH); Raphael Bourquin, Neerach (CH); Armin Brühwiler, Bütschwil (CH); Didier Lootens, Küssnacht (CH)

(73) Assignee: SIKA TECHNOLOGY AG, Baar (CH)

( * ) Notice: Subject to any disclaimer, the term of this patent is extended or adjusted under 35 U.S.C. 154(b) by 275 days.

(21) Appl. No.: 16/630,942

(22) PCT Filed: Aug. 9, 2018

(86) PCT No.: PCT/EP2018/071639
§ 371 (c)(1),
(2) Date: Jan. 14, 2020

(87) PCT Pub. No.: WO2019/030330
PCT Pub. Date: Feb. 14, 2019

(65) Prior Publication Data
US 2020/0156284 A1 May 21, 2020

(30) Foreign Application Priority Data
Aug. 9, 2017 (EP) ..................... 17185650

(51) Int. Cl.
*B33Y 30/00* (2015.01)
*B28C 5/12* (2006.01)
(Continued)

(52) U.S. Cl.
CPC ........ *B28C 5/1253* (2013.01); *B01F 27/1121* (2022.01); *B01F 27/1921* (2022.01);
(Continued)

(58) Field of Classification Search
CPC ......... B28C 5/1253; B28C 5/148; B28C 5/20; B28C 5/146; B28B 1/001; B33Y 30/00
See application file for complete search history.

(56) References Cited

U.S. PATENT DOCUMENTS

| 4,191,478 A | 3/1980 | Zupancic et al. |
| 2004/0257909 A1* | 12/2004 | Pieroni ............. B05C 17/00516 |
| | | 222/145.6 |

(Continued)

FOREIGN PATENT DOCUMENTS

| CN | 204019730 U | 12/2014 |
| CN | 104999562 A | 10/2015 |

(Continued)

OTHER PUBLICATIONS

Oct. 11, 2018 Search Report issued in International Patent Application No. PCT/EP2018/071639.

(Continued)

*Primary Examiner* — Joseph S Del Sole
*Assistant Examiner* — Baileigh Kate Darnell
(74) *Attorney, Agent, or Firm* — Oliff PLC

(57) ABSTRACT

A system for applying a building material, including: a movement device for modifying a site of application in a space; a first component of the building material; a second component of the building material; a mixer for mixing the first component and the second component, the mixer including a drive module with a first coupling element and a mixing chamber module with a second coupling element, the drive module and the mixing chamber module being detachably embodied, and the drive module and the mixing chamber module being actively interconnected in an application state of the system by means of the coupling elements.

13 Claims, 4 Drawing Sheets

(51) Int. Cl.
    *B28B 1/00*         (2006.01)
    *B28C 5/14*         (2006.01)
    *E04G 21/04*       (2006.01)
    *B01F 27/213*      (2022.01)
    *B01F 27/1121*     (2022.01)
    *B01F 27/192*      (2022.01)
    *B01F 33/501*      (2022.01)
    *B01F 35/00*       (2022.01)
    *B01F 101/28*      (2022.01)

(52) U.S. Cl.
    CPC ........ *B01F 27/213* (2022.01); *B01F 33/5013* (2022.01); *B01F 35/561* (2022.01); *B28B 1/001* (2013.01); *B28C 5/148* (2013.01); *B33Y 30/00* (2014.12); *E04G 21/0427* (2013.01); *B01F 2101/28* (2022.01)

(56) References Cited

U.S. PATENT DOCUMENTS

| | | | | |
|---|---|---|---|---|
| 2009/0279382 | A1* | 11/2009 | Harre | A61C 9/0026 366/199 |
| 2014/0252668 | A1* | 9/2014 | Austin | B28B 17/0081 425/375 |
| 2018/0093373 | A1* | 4/2018 | Niederberger | B25J 9/026 |
| 2019/0194072 | A1* | 6/2019 | Esnault | B33Y 70/00 |

FOREIGN PATENT DOCUMENTS

| | | |
|---|---|---|
| CN | 105666640 A | 6/2016 |
| CN | 106903776 A | 6/2017 |
| CN | 106988535 A | 7/2017 |
| CN | 206317240 U | 7/2017 |
| EP | 1 017 552 B1 | 7/2004 |
| EP | 1 836 992 A1 | 9/2007 |
| JP | S52171830 U | 12/1977 |
| JP | S60-132836 U | 9/1985 |
| JP | S60-155038 U | 10/1985 |
| JP | H03-186334 A | 8/1991 |
| JP | H05-345122 A | 12/1993 |
| JP | H06166019 A | 6/1994 |
| JP | 2006-515908 A | 6/2006 |
| JP | 2009095781 A | 5/2009 |
| JP | 2015-502870 A | 1/2015 |
| WO | 2013/064826 A1 | 5/2013 |

OTHER PUBLICATIONS

Feb. 11, 2020 International Preliminary Report on Patentability issued in International Patent Application No. PCT/EP2018/071639.

* cited by examiner

DEVICE FOR APPLYING A BUILDING MATERIAL

The present invention relates to a system for applying a building material as well as a to a mixer for use in such a system.

Various types of systems have already been proposed for applying building materials in an automated manner. Thus, for example, WO 2013/064826 A1 discloses a method as well as a device for applying cementitious materials. In this case, liquid cementitious material is applied to a destination point via a movable robot arm. A disadvantage of such and similar known systems is that cleaning of components which come into contact with the building material is often difficult. This is the case, in particular, when an accelerating admixture or similar is added to the cementitious building material. Passage openings of such systems tend to become blocked because the initial liquid building material can have already solidified in the application device.

An object of the present invention consequently consists in making available a system for applying a building material which is able to be maintained or cleaned in a simple manner, in particular regarding components which come into contact with the building materials.

Said object is achieved by a system for applying a building material, the system including: a movement device for changing a site of application within a space; a first component of the building material; a second component of the building material; and a mixer for mixing the first component and the second component; wherein the mixer includes a drive module with a first coupling element and a mixing chamber module with a second coupling element, wherein the drive module and the mixing chamber module are realized so as to be separable from one another by means of the coupling elements, and wherein the drive module and the mixing chamber module are operatively connected together by means of the coupling elements when the system is in an application state.

The initial advantage of the proposed solution is that as a result of a simple separation of drive module and mixing chamber module, the mixing chamber module is removable as an entire unit and as a result can be exchanged. This is advantageous, in particular, when there is a blockage of building material in the mixing chamber and the system is to be ready for operation again as quickly as possible in order to continue to apply building material. Using the system proposed here, the mixing chamber module can be separated off as an entire unit in such a case and replaced by a clean mixing chamber module or one that is not blocked. This ensures that blockages in the mixing chamber are bridged as quickly as possible.

The additional advantage provided by the system proposed here is that when the mixing chamber module is separated off, the rotating components in the mixing chamber are separated from the drive so that for cleaning and/or maintenance work on the mixing chamber a risk produced by components continuing to rotate can be avoided. A cleaning or maintenance job on the mixing chamber module can be performed as soon as the mixing chamber module is separated from the drive without, in this case, components of the mixing chamber module continuing to be driven.

An additional advantage of the system proposed here is that the mixing chamber module can be separated from the system as an entire unit and, for example, can be moved for cleaning the mixing chamber module to a site provided for this purpose so that the mixing chamber module can be cleaned or repaired and can then be reconnected to the system as an entire unit by means of the coupling mechanism between the drive module and the mixing chamber module.

A further advantage consists in that using the mixing chamber module, a relatively light component is removable from the system for cleaning and/or maintenance work, as a result of which heavier elements, such as, for example, the drive, are able to remain in the system.

In one embodiment as an example, the mixer is arranged on a head of the movement device so that the mixer is situated in each case in a region of the site of application.

The advantage of such an arrangement of the mixer in the system is that the first and the second components are not mixed until shortly before the building material leaves the system. As a result, an accelerating admixture can be mixed in as a constituent of one of the components so that the building material can set as quickly as possible after leaving the system, for example.

In one embodiment as an example, the drive module is arranged on the movement device, wherein the mixing chamber module is also separated from the movement device when it is in a state separated from the drive module.

As a result of the mixer being arranged in such a manner on the system, there is the advantage that the drive module can remain in the system when the mixing chamber module is separated from the drive module. As a result, heavier components, such as, for example, the drive itself, are able to remain in the device, whilst lighter components, such as the mixing chamber module, can be removed from the system in order to carry out cleaning and/or maintenance work.

In one embodiment as an example, the first coupling element and the second coupling element each comprise a toothing, wherein the drive module and the mixing chamber module are operatively connected together mechanically in the application state.

In an alternative exemplary embodiment, the drive module and the mixing chamber module are operatively connected together in a magnetic or other manner in the application state. Further possible designs of the coupling as examples include tooth coupling, plate coupling, bolt coupling, jaw coupling, flow coupling, slip coupling, centrifugal coupling, metal bellows coupling, flange coupling, grinding coupling, spring coupling, plug coupling, Oldham coupling, Periflex coupling, ring clamping coupling, sleeve coupling or friction coupling.

The advantage of a mechanical operative connection between the modules is that, as a result, a sturdy and cost-efficient system can be realized.

In one embodiment as an example, the mixing chamber module includes a drum module and a shaft module which are realized so as to be separable from one another.

The advantage of providing separable submodules of the mixing chamber module is that the mixing chamber module is realized so that it can be split again for cleaning the mixing chamber so that the spaces to be cleaned and/or to be maintained are more easily accessible. In addition, as a result, individual submodules, such as, for example, the shaft module, can be exchanged, and other submodules, such as, for example, the drum module, can continue to be used for a further application of the building material. For example, different shaft modules can also be used for different application purposes. As a result of the module-like design proposed here, such different types of shaft modules can be exchanged in a simple manner.

In one embodiment as an example, the drum module includes a drum with at least one inlet and one outlet as well as a distal closure.

In one embodiment as an example, the drum of the drum module is realized in one piece and/or is realized in a tubular manner.

The advantage of providing an, in particular, tubular, one-piece drum is that a mechanically sturdy and safe system can be made available. In addition, it is easier to seal such a one-piece drum than it is to seal drums produced from multiple components. In addition, a one-piece drum tends to be lighter than drums which are constructed from multiple components. And in addition, a one-piece drum enables more precise bearing arrangements for a rotational axis in end regions of the drum. This is significant, in particular, in the case of high rotational speeds.

In one embodiment as an example, the proximal and/or the distal closure include(s) a protection plate on a side which faces toward the drum.

The advantage of providing such a protection plate is that the building material conveyed by the drum damages the protection plate and not the closure per se so that the proximal and/or distal closure(s) is/are usable over a longer period of time. In this case, the protection plate can be exchanged at regular intervals.

In one embodiment as an example, the drum includes at least one first inlet and one second inlet in a first end region of the drum, wherein the outlet is arranged in a second end region of the drum.

In one further development as an example, the drum additionally includes a third inlet.

In one further development as an example, the drum additionally includes a fourth inlet.

In one further development as an example, the drum additionally includes a fifth inlet.

The advantage of providing two or more inlets is that, on the one hand, the first component and the second component can be mixed directly in the drum, and/or that for rinsing or cleaning the drum a cleaning liquid can be brought into the drum through a separate inlet. In addition, additional inlets can be used in order to add, for example, a color component or additive.

The advantage of arranging the inlets and the outlet each at opposite end regions of the drum is that the entire drum volume is available both for mixing the components and for cleaning the drum.

In one embodiment as an example, the shaft module includes the second coupling element, a proximal closure and an agitating shaft, wherein the agitating shaft is operatively connected to the second coupling element.

The advantage of a shaft module designed in such a manner is that, as a result, components and spaces of the mixer can be made readily accessible for the cleaning or maintenance of the mixer by the shaft module being separated from the drum module.

In one embodiment as an example, the agitating shaft is fitted with pins on a first portion and/or the agitating shaft is fitted with pins.

In a further development as an example, the pins are provided with an external thread so that the pins can be rotated into corresponding holes with internal threads in the agitating shaft. This enables simple exchange or addition or removal of pins on the agitating shaft. In addition, such a design of the pins makes it possible to adapt or to change a component pattern of the shaft with pins in a simple manner.

In one embodiment as an example, the agitating shaft has on a second portion a conveying element which is operatively connected to the agitating shaft and, as a result, to the second coupling element.

The advantage of providing such a conveying element on the agitating shaft is that, as a result, the building material is not only mixed thoroughly in the mixing chamber but that it is also able to be conveyed out of the mixing chamber by means of the conveying element.

In a further development as an example, the conveying element is realized as a screw conveyor.

It has been shown in trials that screw conveyors are particularly well suited to conveying the building material out of the mixing chamber at a desired pressure.

In another further development as an example, the conveying element is realized so as to be removable from the agitating shaft. In particular, in this case, the conveying element is removable from the agitating shaft in a tool-free manner. The advantage of this is that, as a result, for example, the screw conveyor can be exchanged, or that the individual elements of the shaft module are more easily accessible for cleaning and/or maintenance work. For example, it can be necessary to use different screw conveyors for different building materials. By means of a conveying element which is removable from the agitating shaft, it is possible in a simple manner to exchange a conveying element where required.

In a further development as an example, the conveying element is secured on the agitating shaft by means of a locking element. In particular, in this case, the conveying element is arranged non-rotatably on the agitating shaft.

In an alternative embodiment, the conveying element is fixed on the agitating shaft by a bayonet closure or is screw-connected or press-fitted or clamped or bonded or plugged or locked or is fixed on the agitating shaft with pins and bolts.

In one embodiment as an example, the drive module includes a support device which is connected to the distal closure in the application state, wherein the distal closure has at least one bearing for the agitating shaft.

This provides the advantage that the agitating shaft can be supported on the drive module via at least one bearing in the distal closure and at least one bearing in the proximal closure. In particular, in the case of rotational high speeds, a sturdy and safe bearing arrangement for the agitating shaft is significant.

In one embodiment as an example, the support device has a device, in particular a fixing means such as, for example, a screw, in order to define a positioning of the drive module relative to the mixing chamber module in the direction of the agitating shaft.

This provides the advantage that, as a result, an optimal and reproducible connection between the first coupling element and the second coupling element can be achieved.

In one embodiment as an example, the support device has a further device, in particular fixing means such as, for example, screws, in order to secure the mixing chamber module to the drive module.

This provides the advantage that, as a result, even where the movement device moves in a quicker manner, the mixing chamber module is entrained precisely with the drive module, and, in addition, tends to vibrate less.

In one embodiment as an example, the first component includes a pumpable concrete and the second component includes an accelerating admixture.

As a result, the pumpable concrete and the accelerating admixture are mixed together in the mixing chamber and the mixture is then applied. It has been shown in trials that as good a mixture as possible of pumpable concrete and accelerating admixture is important for the setting behavior of the building material after the application of the same. In addition, it is advantageous when said components are mixed together as close as possible to the application of the building material. As a result, the accelerating admixture can be administered in higher doses, which results in the building material setting more quickly once it has been applied. This once again allows for higher speeds when designing a structure with the applied building material.

In an alternative embodiment, the building material is a multi-component composition on a plastics material base. In this case, the first component typically includes a reactive polymer or monomer and the second component a hardener or accelerator for the cross-linking or curing of said polymer or monomer. For example, such compositions are epoxy resins, polyurethanes, functional silane polymers, silicones, acrylates and the like.

In one embodiment as an example, the movement device for changing a site of application within a space is realized as a crane. In particular, in this case, the mixer is arranged on a head of the crane.

In an alternative embodiment, the movement device for changing a site of application within a space is realized in the form of a 3D printer. In particular, in this case, the mixer is arranged on a print head of said 3D printer.

In one embodiment as an example, the site of application within the space can be changed by means of the movement device in one dimension or in two dimensions or in three dimensions.

The advantage of the possibility to be able to change the site of application in as many dimensions as possible is that, as a result, more complex structures can be produced with the building material. In particular, the use of a movement device which can be moved in three dimensions with regard to the site of application is advantageous because, as a result, complex three-dimensional structures can be produced from the building material.

Details and advantages of the invention are described below by way of exemplary embodiments and with reference to schematic drawings, in which.

Figure 1:
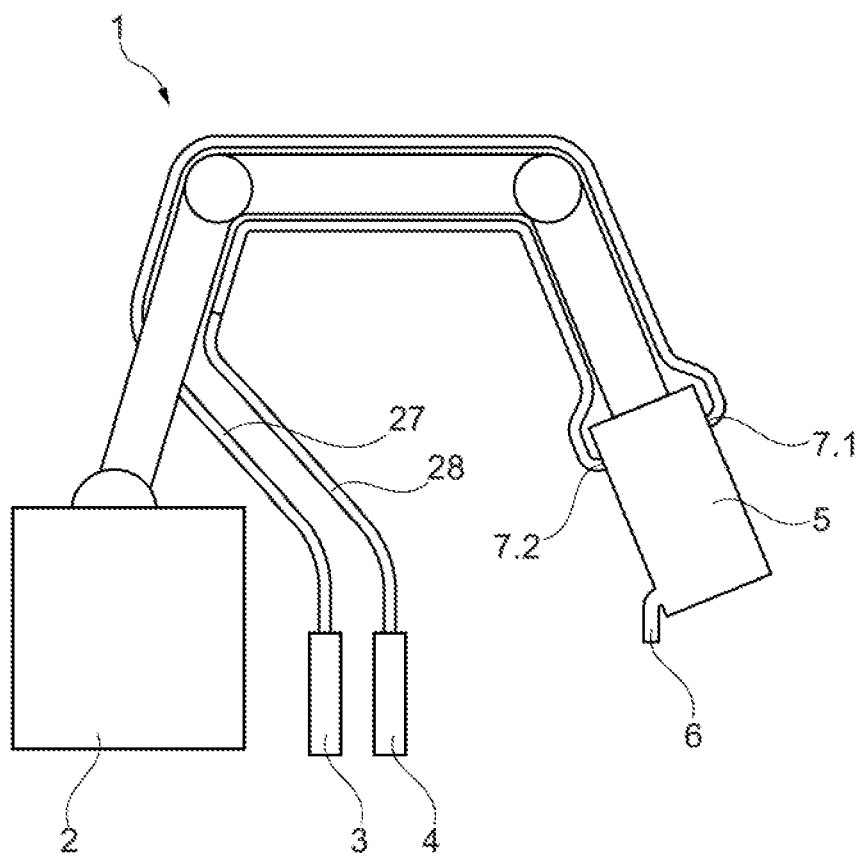
FIG. 1 shows a schematic representation of a system for applying a building material as an example.

FIG. 1 shows a schematic representation of a system 1 for applying a building material as an example. The system 1 includes, in this case, a movement device 2 for changing a site of application within a space. In this exemplary embodiment, the movement device 2 is realized as a crane-like device with a movable arm.

The system 1 additionally includes a first component 3 and a second component 4. In this exemplary embodiment, the first component 3 and the second component 4 are each arranged in a container from which the components can be fed to the mixer 5 in each case via a first hose 27 and a second hose 28. Pumps (not shown) are used, for example, for conveying the first component 3 and the second component 4.

The first component 3 is fed to the mixer 5 via a first inlet 7.1. The second component 4 is fed to the mixer 5 via a second inlet 7.2. In this case, the first component 3 and the second component 4 are mixed together in the mixer 5. Once the components 3, 4 have been mixed, the building material is applied via an outlet 6. The outlet 6 can be arranged, in this case, directly on the mixer 5. In addition, the outlet 6 can include a nozzle (not shown) in order to be able to apply the building material in a desired form.

In particular, a pumpable concrete, that is to say a liquid concrete which can be pumped through a hose system, is used as first component 3 and a liquid including an accelerating admixture is used as second component 4. As a result, the building material sets as quickly as possible after its application so that a structure can be constructed in layers from the building material. The quicker the building material sets after its application, the quicker the structure can be constructed, and the more dimensionally stable the structure remains after application of the building material.

Depending on the area of application, the movement device 2 can also be designed in another manner, in particular in the manner of a 3D printer.

Figure 2:
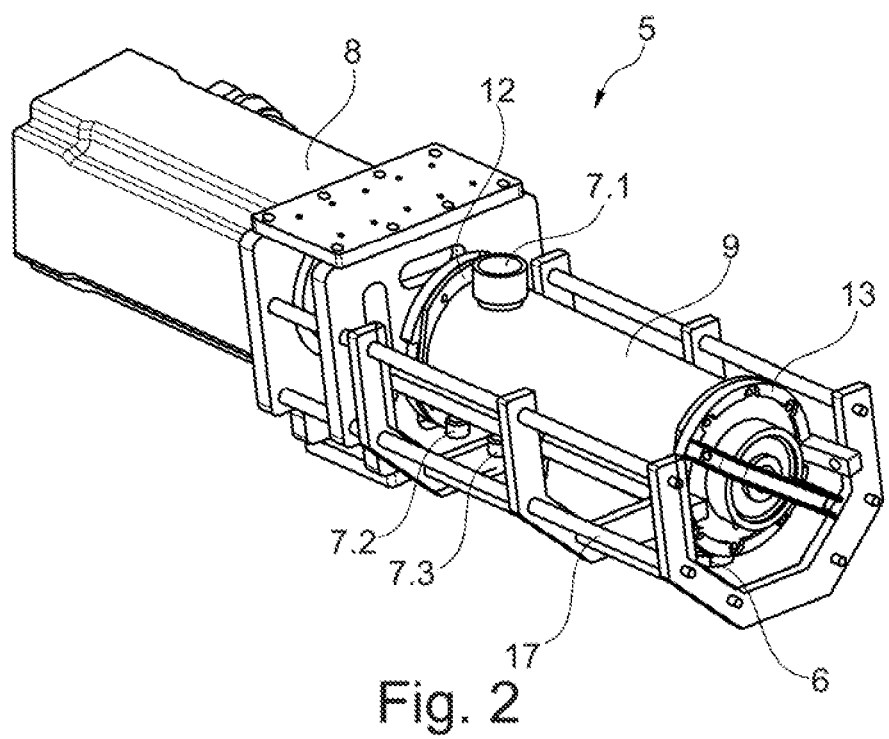
FIG. 2 shows a schematic representation of a mixer as an example.

FIG. 2 shows a schematic representation of a mixer 5 as an example. The mixer 5 includes a drive 8, a drum 9, a proximal closure 12, a distal closure 13, an outlet 6, a first inlet 7.1, a second inlet 7.2, a third inlet 7.3 and a support device 17. In this case, for example, the first component 3 can be fed via the first inlet 7.1, the second component 4 via the third inlet 7.3, the second inlet 7.2 being able to be used for cleaning the drum 9 with a cleaning liquid.

The building material can be applied, for example, directly via the outlet 6, or a nozzle (not shown) or further components can be mounted at the outlet 6.

In this exemplary embodiment, the distal closure 13 is connected to the drive 8 via the support device 17 so that an agitating shaft (not visible in this image) can be mounted both in the proximal closure 12 and in the distal closure 13.

Figure 3A:
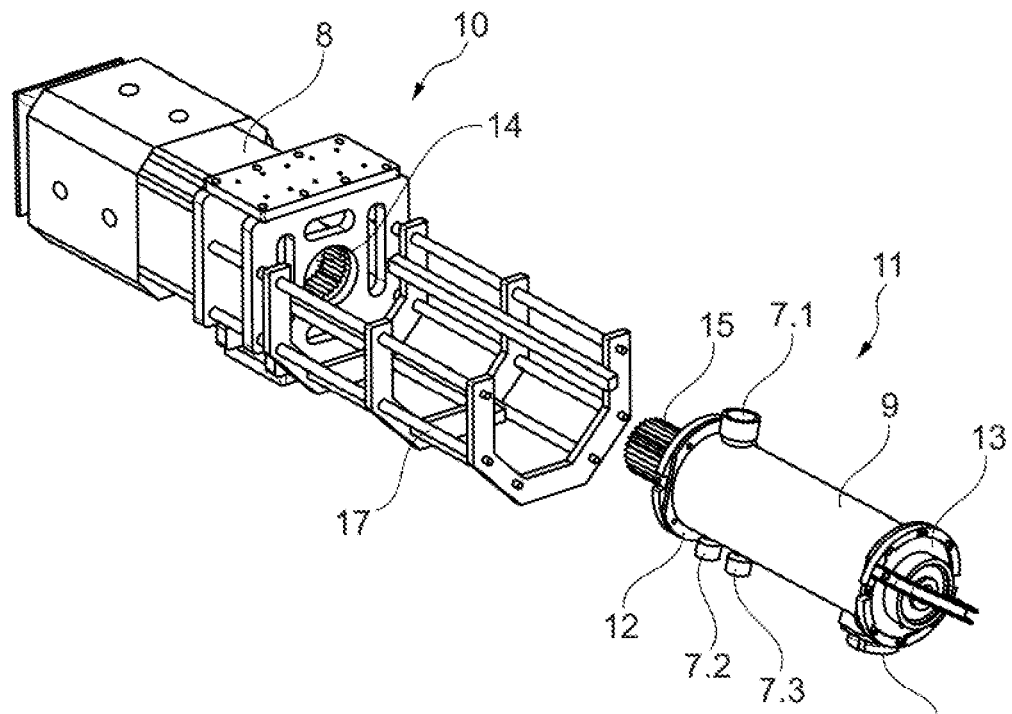
FIG. 3a shows a schematic representation of a drive module and mixing chamber module of a mixer as an example.
Figure 3B:
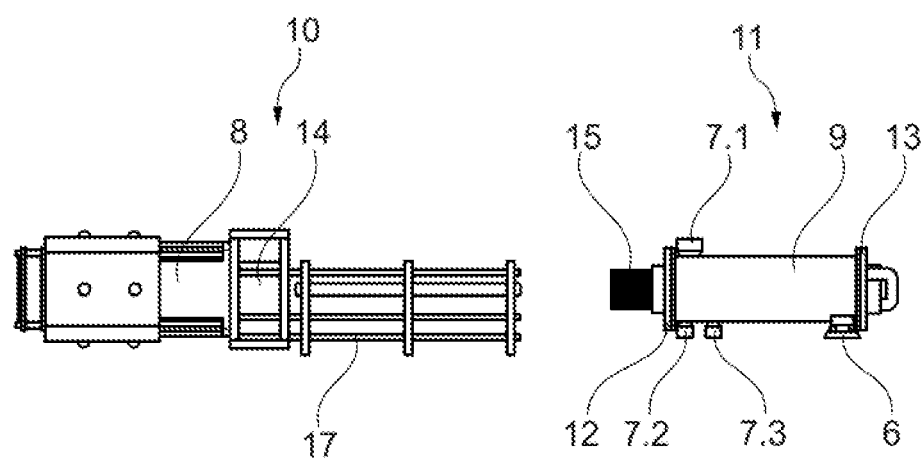
FIG. 3b shows a schematic representation of a drive module and mixing chamber module of a mixer as an example.

FIGS. 3a and 3b each show the same mixer 5 as shown in FIG. 2 but in said images the drive module 10 and the mixing chamber module 11 are separated from one another. It can be seen in this case that the drive module 10 includes a first coupling element 14 and the mixing chamber module 11 includes a second coupling element 15. In this exemplary embodiment, the coupling elements 14, 15 each have a toothing and the toothings mesh in an application state.

As a result of the separable arrangement of mixing chamber module 11 and drive module 10, the mixing chamber module 11, in particular, can be removed from the system 1 in order to carry out cleaning and/or maintenance work on the mixing chamber module 11. In particular, as a result, the drum 9 can be cleaned in a simple manner without, in this case, the entire mixer 5 having to be disassembled from the system 1.

Figure 4A:
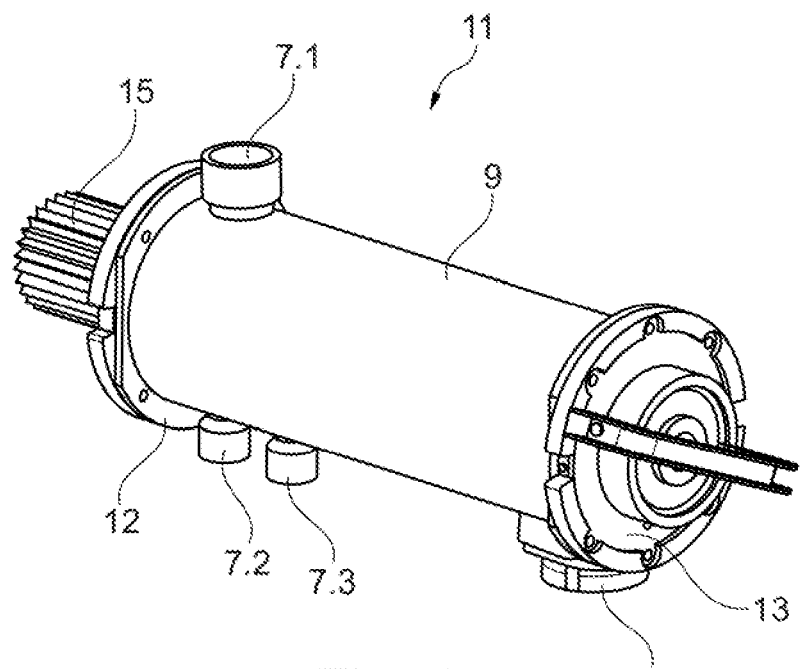
FIG. 4a shows a schematic representation of a mixing chamber module as an example.
Figure 4B:
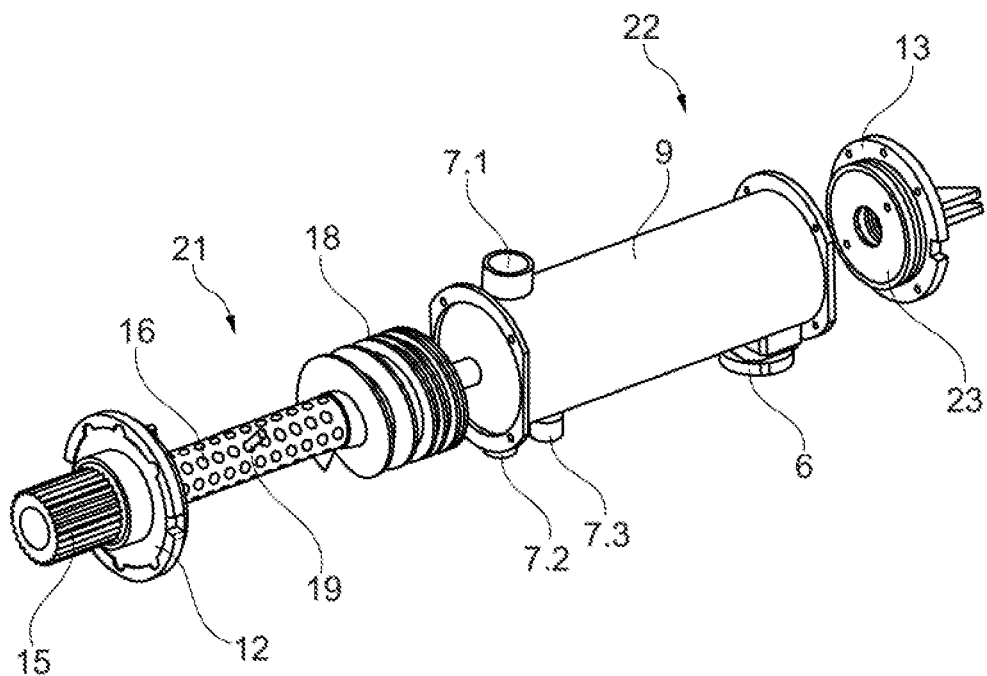
FIG. 4b shows a schematic representation of a shaft module and drum module of a mixing chamber module as an example.

FIGS. 4a and 4b each show the mixing chamber module 11 without the drive module 10. In this case, the mixing chamber module 11 is shown in an assembled state in FIG.

4a and in FIG. 4b the mixing chamber module 11 is shown in a separated state. In this exemplary embodiment, the mixing chamber module 11 includes a shaft module 21 and a drum module 22.

In this exemplary embodiment, the shaft module 21 includes the second coupling element 15, the proximal closure 12, the agitating shaft 16 and a conveying element 18.

In this exemplary embodiment, the drum module 22 includes a one-piece tubular drum 9 and a distal closure 13. The drum 9, in this case, has a first inlet 7.1, a second inlet 7.2 and a third inlet 7.3, which are all arranged in a first end region of the drum 9. The outlet 6 is arranged, in this case, on a second end region of the drum 9.

In this exemplary embodiment, the distal closure 13 has a protection plate 23 which is arranged on a side of the distal closure 13 which faces the drum 9. The protection plate 23 becomes worn during operation of the system and can be replaced where necessary. As a result, the distal closure 13 is able to be used over a longer period of time.

Figure 5:
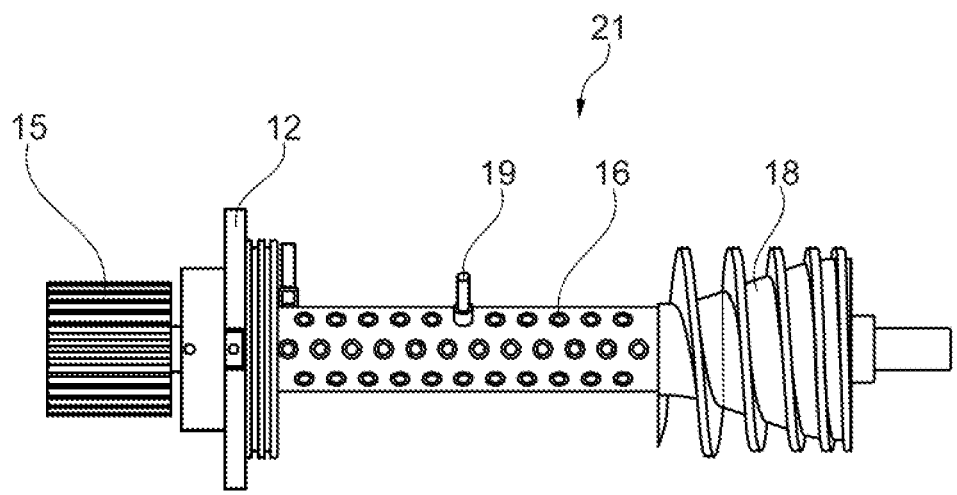
FIG. 5 shows a schematic representation of a shaft module as an example.

FIG. 5 then shows the shaft module 21 without the drum module 22. Once again, the shaft module 21 comprises the second coupling element 15, the proximal closure 12, the agitating shaft 16 and the conveying element 18. The agitating shaft 16 has pins 19 which, in this exemplary embodiment, are screwed into the agitating shaft. Just two pins 19 are shown for better clarity of presentation. It goes without saying that for mixing the first component and the second component efficiently, multiple pins 19 can be screwed-in onto the agitating shaft 16.

The conveying element 18 is realized as a screw conveyor in this exemplary embodiment.

Figure 6:
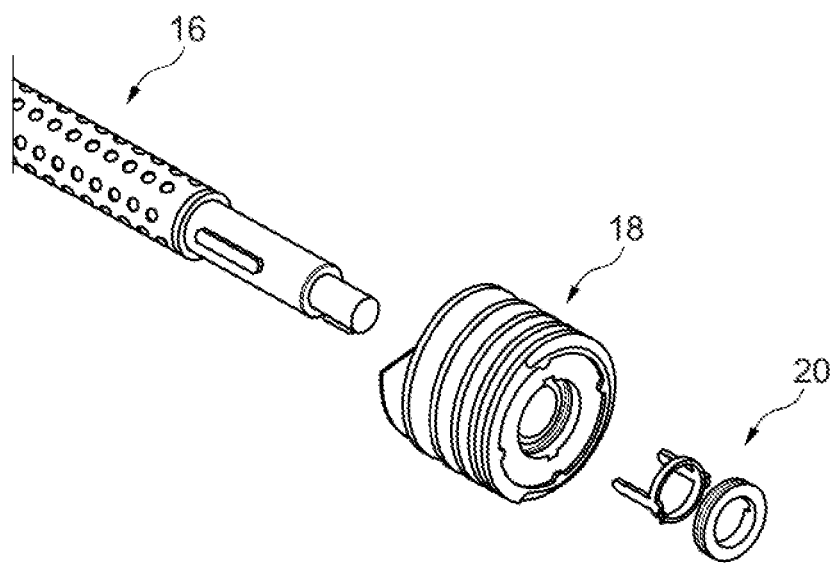
FIG. 6 shows a schematic representation of a conveying element as an example.

FIG. 6 shows a conveying element 18 as an example which is designed so as to be removable from the agitating shaft 16. In order to move the conveying element 18 into operative connection with the agitating shaft 16, the conveying element 18 is plugged onto projections provided on the agitating shaft 16 and is secured on the agitating shaft 16 with a locking element 20. Such a removable conveying element 18 can be exchanged in a simple manner.

LIST OF REFERENCES

1 System
2 Movement device
3 First component
4 Second component
5 Mixer
6 Outlet
7 Inlet
7.1 First inlet
7.2 Second inlet
7.3 Third inlet
8 Drive
9 Drum
10 Drive module
11 Mixing chamber module
12 Proximal closure
13 Distal closure
14 First coupling element
15 Second coupling element
16 Agitating shaft
17 Support device
18 Conveying element
19 Pin
20 Locking element
21 Shaft module
22 Drum module
23 Protection plate
27 First hose
28 Second hose

The invention claimed is:

1. A system for applying a building material, the system comprising:
   a movement device for changing a site of application within a space;
   a first component of the building material;
   a second component of the building material; and
   a mixer for mixing the first component and the second component,
   wherein the mixer includes a drive module with a first coupling element and a mixing chamber module with a second coupling element,
   the drive module and the mixing chamber module are configured to be separable from one another by the coupling elements,
   the drive module and the mixing chamber module are operatively connected together by the coupling elements when the system is in an application state,
   the mixing chamber module includes a drum module and a shaft module configured to be separable from one another,
   the shaft module includes the second coupling element, a proximal closure, and an agitating shaft, the agitating shaft being operatively connected to the second coupling element,
   at least one of (i) the agitating shaft is fitted with pins on a first portion, and (ii) the agitating shaft has on a second portion a conveying element which is operatively connected to the agitating shaft and to the second coupling element, and
   the first component includes a pumpable concrete and the second component includes an accelerating admixture.

2. The system as claimed in claim 1, wherein the mixer is arranged on a head of the movement device so that the mixer is situated in a region of the site of application.

3. The system as claimed in claim 1, wherein the drive module is arranged on the movement device, and the mixing chamber module is separated from the movement device when it is in a state separated from the drive module.

4. The system as claimed in claim 1, wherein the first coupling element and the second coupling element each comprise a toothing, and the drive module and the mixing chamber module are operatively connected together mechanically in the application state.

5. The system as claimed in claim 1, wherein the drum module includes a drum with at least one inlet, one outlet, and a distal closure.

6. The system as claimed in claim 5, wherein at least one of (i) the drum of the drum module is in one piece and (ii) the drum of the drum module is tubular.

7. The system as claimed in claim 5, wherein at least one of the proximal closure and the distal closure include a protection plate on a side which faces toward the drum.

8. The system as claimed in claim 5, wherein the drum includes at least one first inlet and one second inlet in a first end region of the drum, and the outlet is arranged in a second end region of the drum.

9. The system as claimed in claim 1, wherein at least on of (i) the conveying element is a screw conveyor, and (ii) the conveying element is configured to be removable from the agitating shaft.

10. The system as claimed in claim 1, wherein the drive module includes a support device which is connected to a distal closure in the application state, and the distal closure has at least one bearing for the agitating shaft.

11. The system as claimed in claim 1, wherein the agitating shaft is fitted with pins on the first portion.

12. The system as claimed in claim 1, wherein the agitating shaft has on the second portion the conveying element which is operatively connected to the agitating shaft and to the second coupling element.

13. A mixer for use in a system comprising:
- a drive module with a first coupling element; and
- a mixing chamber module with a second coupling element,
- wherein the drive module and the mixing chamber module are configured to be separable from one another by the coupling elements, and the drive module and the mixing chamber module are operatively connected together by the coupling elements when the system is in an application state,
- the mixing chamber module includes a drum module and a shaft module configured to be separable from one another,
- the shaft module includes the second coupling element, a proximal closure and an agitating shaft, the agitating shaft being operatively connected to the second coupling element,
- at least one of (i) the agitating shaft is fitted with pins on a first portion, and (ii) the agitating shaft has on a second portion a conveying element which is operatively connected to the agitating shaft and to the second coupling element, and
- the mixer is configured to mix a first component including a pumpable concrete and a second component including an accelerating admixture.

\* \* \* \* \*